United States Patent Office 3,166,523
Patented Jan. 19, 1965

---

3,166,523
ADHESIVE COMPOSITION
Herbert C. Weinheimer, Bainbridge, N.Y., assignor to The Borden Company, New York, N.Y., a corporation of New Jersey
No Drawing. Filed Feb. 17, 1960, Ser. No. 9,190
8 Claims. (Cl. 260—6)

This invention relates to an adhesive and particularly to one which contains casein or like protein reacted with a glycidyl ether in contact with an acidic salt.

When I cause this reaction to occur at a pH established by means of an acid salt such as an acidic fluoride, I obtain an adhesive that is stable in aqueous solution for a period of months and that, in dried film form, retains the desired strength of adhesive bond on immersion of the bonded article in boiling water. This result is in contrast to a few days' stability only and lack of such hot water resistance for a comparable composition in which the protein and glycidyl ether are reacted at a pH above 8 or below 3 and without the use of the acid salt. Also my adhesive has a lower viscosity, this making the adhesive more suitable for use with paper-to-foil laminating machines, for instance, than the higher viscosity adhesives produced heretofore at a pH of 8 or higher. Also the use of the glycidyl ether in a casein-latex adhesive, at a pH below about 7, upgrades the casein so as to provide better and more quickly developing water resistance in adhesive bonds made therefrom. At my pH of the adhesive, the acidity is sufficient to dissolve coatings of oxide on a metal such as aluminum foil and expose the clean metal to bonding with the adhesive but not so high as to dissolve substantial amounts of the metal itself.

The invention comprises the herein described composition, the process of making it, and articles bonded therewith. More specifically, the invention comprises the adhesive containing the protein reacted with the glycidyl ether in contact with a water soluble acidic metal salt, examples of the salt being an alkali metal or ammonium fluoride in amount to make the pH of the composition in aqueous dispersion about 5–7 and for best results about 5.2–6.2. In the preferred embodiment, the invention comprises admixing latex of a rubber or the like plastic material, the latex raising the pH substantially above the minimum stated, i.e., above 5, as to 5.8 or higher. It is to be understood that the glycidyl ether may also be added last, i.e., after the latex.

The adhesive is useful in bonding various materials in sheet form, e.g. paper to paper; paper to wood; wood to wood; a clay coating on paper; and, in the embodiment utilizing a metal fluoride as the acidic salt, in bonding paper to aluminum, bronze, tin or other metal foil or sheet.

As to materials, the protein used is ordinarily any that is soluble in alkaline solution and insoluble in water at a pH between 4–5. For best results, the protein when in an alkaline solution should give a high viscosity in proportion to the concentration of protein. Examples of suitable proteins are casein from milk and the proteins of soy bean, cottonseed, and peanut.

The acid salt used must be water soluble, that is, at least appreciably soluble, and give, in water solution, a pH of 7 or below at which the protein is to be reacted with the glycidyl ether. Examples that illustrate the class to be used are ammonium and acidic alkali metal fluorides, such as the silicofluorides and bifluorides, and normal ammonium fluoride. Sodium and potassium are preferred to the other more expensive alkali metals in the acidic fluorides. Other examples of acidic salts that may be used are ammonium borofluoride ($NH_4BF_4$) and zinc and magnesium silicofluorides. These acid salts make the final adhesive composition satisfactory for use as an adhesive in aqueous dispersion. There may be substituted less effectively other acidic water soluble salts as, for example, sodium or potassium dihydrogen phosphate and dihydrogen citrates, ammonium di- or mono-hydrogen phosphates or citrates, and ammonium oxalate, in amounts to establish the pH of about 5–7. To make any of the acidic salts listed, there may be used the normal salt with hydrochloric, sulfuric or other acid in amount to make the acidic salt, a typical reaction being

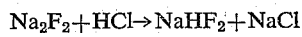

$$Na_2F_2 + HCl \rightarrow NaHF_2 + NaCl$$

As the glycidyl ether for use in reaction with the protein of my composition, I use any such ether of a polyhydric phenol having more than 1 glycidyl equivalent, i.e., the epoxy group

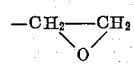

per mole of the ether. With more than the 1 equivalent per mole, cross linking results from the reaction between the glycidyl ether and some terminal group in the protein, as for instance, an amine, mercaptan, hydroxy, carboxy or amide group of the protein. Examples that illustrate the class of glycidyl ethers to be used are such ethers of novolak, bisphenol, bisphenol-A of the formula

$$HOC_6H_4-C(CH_3)_2-C_6H_4OH$$

and resorcinol. These glycidyl ethers are polymerizable by an alkylene polyamide, examples being ethylene diamine or triethylene tetramine.

The latex I use may be any described in U.S. Patent 2,745,240, issued to Kinney on May 3, 1951. Examples of the plastic materials that may be used in a latex type of dispersion are the following polymers or copolymers: natural rubber neoprene (polymerized chloroprene), butadiene-acrylonitrile copolymer, polyacrylates, polyethylene, butyl rubber (copolymer of isobutylene and isoprene), polybutene, styrene-butadiene copolymer, ethylene polysufide polymer, and polyvinyl acetate.

I may and ordinarily do introduce minor or chemically inert components of any kind and in proportion that is conventional in adhesives of this class and for their usual purpose. Thus I may use a preservative for the proteins; an antioxidant for the plastic material such as rubber or synthetic rubber in the latex selected; a defoamer; and a stabilizer for the plastic of the latex.

Proportions of the several materials that are permissible in my adhesive and also those recommended for commercial use are shown in the following table, all proportions being given here and elsewhere herein on the dry basis except as noted specifically to the contrary.

| Component | Parts by Weight | |
|---|---|---|
| | Permissible | Commercial |
| Protein | 100 | 100 |
| Glycidyl ether of polyhydricphenol | 5–100 | 10–25 |
| Acid salt | To establish the pH stated | |
| Latex solids | 125–350 | 135–250 |
| Water | To give concentration of solids desired | |
| Minor components of usual kinds | Conventional | Conventional |

Suitable amounts of water are 335 to 735 parts for 100 of casein or 55 to 65 parts of water for 100 of the whole adhesive composition.

The proportion of the glycidyl ether may be about 0.5%–10% of the weight of the finished aqueous adhesive solution. I have found that proportions of approximately 1%–2% of the ether on the weight of the aqueous adhesive or 10%–25% on the weight of the casein give a well balanced, satisfactory adhesive having the stability of its aqueous solution, low viscosity, and boiling water resistance of the dried film desired in the adhesive for practical applications.

The number of epoxide groups per molecule should be greater than 1, e.g., 1.2–3, per mole of the said ether, so as to provide for cross linking of the ether molecules.

Proportions of the acid salt are about 0.5–6 parts for 100 of casein.

The latex may be omitted when the adhesive is to be used to bond surfaces neither of which is metal.

The acid salt increases the holding to the surface of the material bonded with the adhesive.

As to conditions, the various components of the adhesive are mixed into a substantially uniform dispersion. An elevated temperature such as 170°–180° F. is normally used for the mixing and dispersion of the protein.

The invention will be further illustrated by the following specific examples, proportions here and elsewhere herein being expressed as parts by weight except as stated to the contrary.

EXAMPLE 1

A casein solution was prepared of the following composition.

*Casein Solution A*

| Component: | Parts |
|---|---|
| Casein | 17.7 |
| Ammonia, 26° Bé. (solubilizer for the casein) | 1.0 |
| Ammonium silicofluoride (equal to 0.64 F.) | 1.0 |
| Water | 79.9 |
| Ethyl parahydroxybenzoate preservative) | 0.3 |
| Dowicide A (sodium salt of o-phenyl phenol) | 0.1 |
| Total | 100.0 |

The pH of this Solution A was 5.2–6.2, the exact pH varying somewhat in different preparations with differing qualities of the starting materials.

Into 100 parts of this Solution A I introduced the glycidyl ether of 4,4'-di(hydroxphenyl)methane in the amount of 4 parts. To this mixture I then added 108 parts of neoprene latex at 50% solids concentration. The pH was then 6.0–6.4 and the viscosity 4000–7000 cps.

I also prepared a like composition by adding the latex first to Solution A followed by the addition of the glycidly ether, all in the same proportions as above. The product had a pH and viscosity in the same range as above.

For contrast with my invention, I used a casein composition similar to Solution A and introduced latex as immediately above but no silicofluoride or other acid salt. The resulting casein-latex product had a pH of 9.38, a viscosity of 27,000 cps. for an aqueous dispersion of solids content 35%, and a liquid life of only 3 days before gelling. Also the glue when used in laminating paper to aluminum foil showed separation of the glued product in boiling water.

EXAMPLE 2

The procedure and composition of Example 1 were used except that the ammonium silicofluoride was replaced on an equal weight basis by sodium dihydrogen phosphate. This gave an adhesive of pH 7.4 The adhesive so made was useful in adhering cellulosic surfaces but not paper to metal foil.

EXAMPLE 3

The compositions and procedures of Example 1 are used except that the casein there used is replaced in turn, by equal weights of soy, peanut, and cottonseed protein, either in isolated or non-separated condition.

EXAMPLE 4

The procedures of Examples 1–3 and the compositions thereof are followed except that the glycidyl ether there used is replaced by an equal weight of any of the other glycidyl ethers shown herein.

EXAMPLE 5

The procedures of Examples 1–4 and the compositions thereof are followed except that the latex there used is replaced by an equal weight on the dry basis of the latex of any of the other plastic materials shown herein.

It will be understood that it is intended to cover all changes and modifications of the examples of the invention herein chosen for the purpose of illustration which do not constitute departures from the spirit and scope of the invention.

I claim:

1. An adhesive comprising an aqueous dispersion of the reaction product of an alkali soluble protein that is insoluble in water in the pH range 4–5 and an alkylene polyamine-polymerizable glycidyl ether of a polyhydric phenol containing more than one epoxy equivalent per molecule of the ether in contact with an acidic water soluble salt in amount to establish the pH at about 5–7, the proportions on the dry basis being about 5–100 parts by weight of the glycidyl ether for 100 parts of the protein and the said reaction product in dried film form retaining its adhesive properties in boiling water.

2. The composition of claim 1, the said protein being selected from the group consisting of casein and soy, peanut and cottonseed proteins.

3. The composition of claim 1, the said ether being epoxidized novolac.

4. The composition of claim 1, the said ether being epoxidized bisphenol.

5. The composition of claim 1, the said salt being selected from the group consisting of the fluoride, silicofluoride, bifluoride, and borofluoride of ammonium; zinc and magnesium silicofluoride; and alkali metal silicofluorides and bifluorides.

6. The composition of claim 1, the said salt being an acidic metal fluoride and the adhesive being in the form of an aqueous dispersion including admixed aqueous dispersion of plastic material.

7. The composition of claim 1, the adhesive being in the form of an aqueous dispersion and including an admixed latex of plastic material selected from the group consisting of rubber, polymer of chloroprene, butadiene-acrylonitrile copolymer, polyacrylates, polyethylene, copolymer of isobutylene and isoprene, polybutene, styrene-butadiene copolymer, ethylene polysulfide polymer, and polyvinyl acetate.

8. The composition of claim 1, the said protein being casein.

References Cited in the file of this patent

UNITED STATES PATENTS

| 2,014,167 | Bowen | Sept. 10, 1935 |
| 2,872,427 | Schroeder | Feb. 3, 1959 |
| 2,882,250 | Baker | Apr. 14, 1959 |
| 2,933,471 | Greenlee | Apr. 19, 1960 |
| 2,935,488 | Phillips et al. | May 3, 1960 |

OTHER REFERENCES

Pinner, "British Plastics," November 1950, pp. 157–162; p. 157 relied upon.